H. FOECKE.
TRACTOR WHEEL.
APPLICATION FILED JAN. 29, 1917.
1,228,895.
Patented June 5, 1917.
2 SHEETS—SHEET 1.
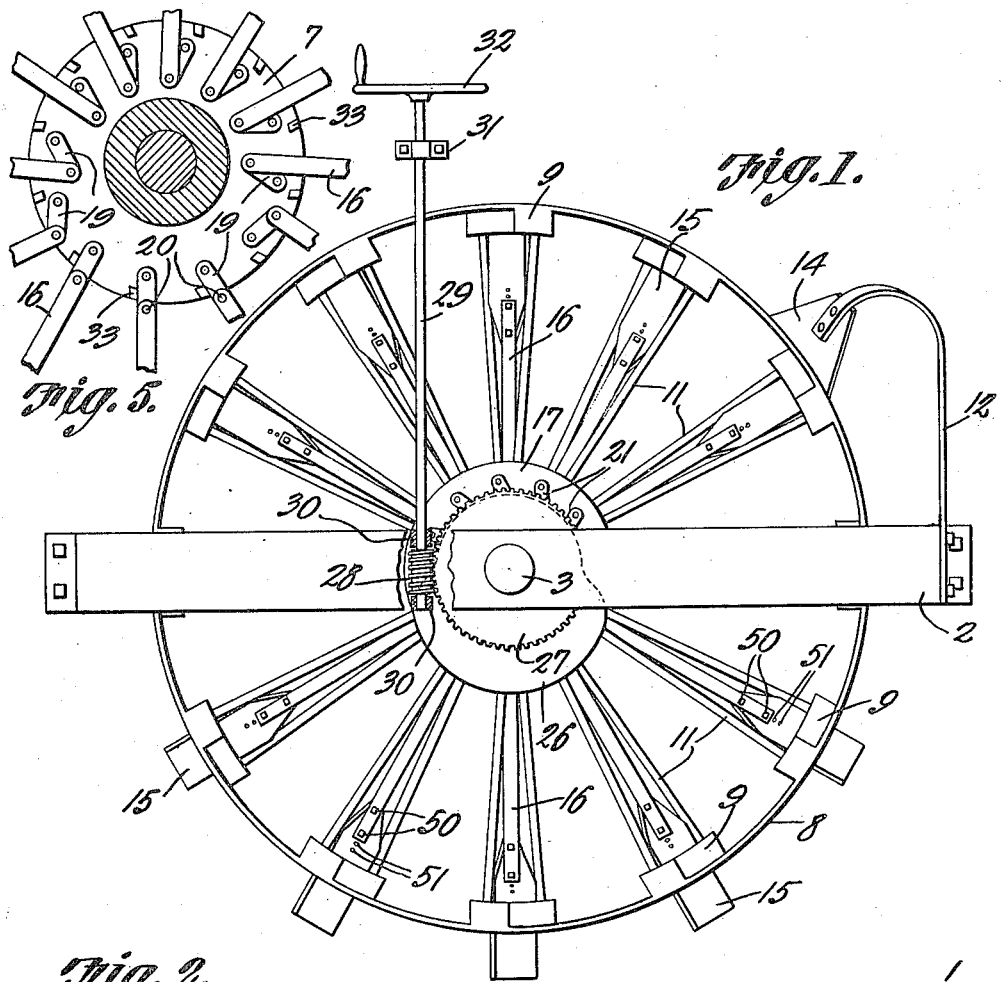
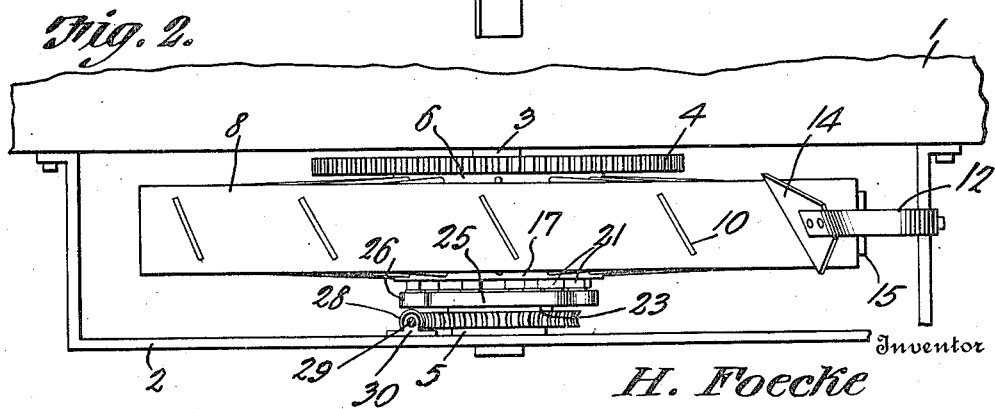
Witnesses
Inventor
H. Foecke
By C.A. Snow & Co.
Attorney

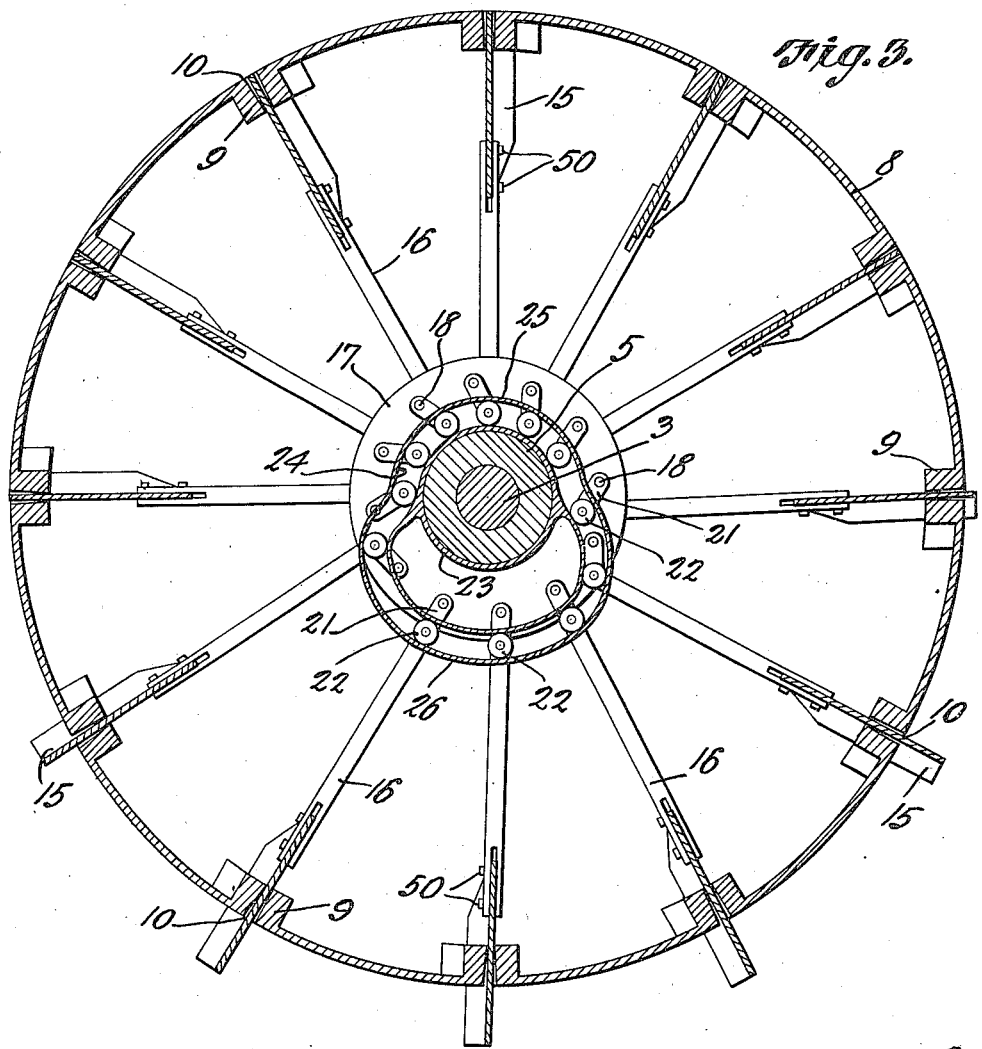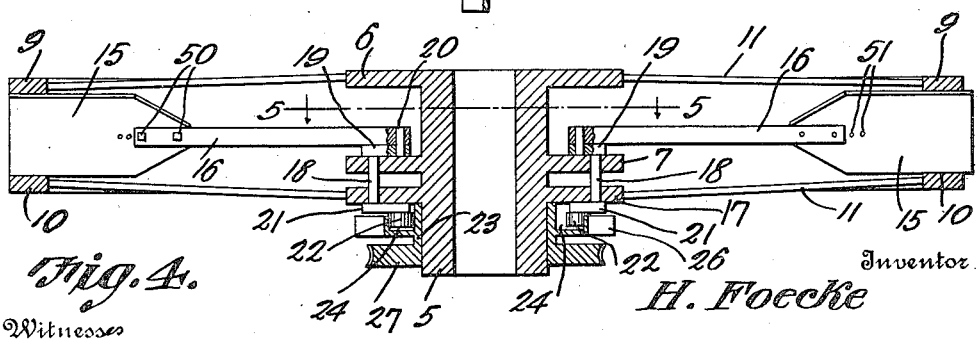

UNITED STATES PATENT OFFICE.

HENRY FOECKE, OF CROFTON, NEBRASKA.

TRACTOR-WHEEL.

1,228,895.  Specification of Letters Patent.  Patented June 5, 1917.

Application filed January 29, 1917. Serial No. 145,231.

*To all whom it may concern:*

Be it known that I, HENRY FOECKE, a citizen of the United States, residing at Crofton, in the county of Knox and State of Nebraska, have invented a new and useful Tractor-Wheel, of which the following is a specification.

The device forming the subject matter of this application is a tractor wheel and the invention aims to provide novel means whereby the radially slidable spuds on the tractor wheel may be advanced automatically as they approach the ground, the spuds being retracted as they leave the ground.

Another object of the invention is to provide novel means whereby, at the will of an operator, the spuds may be retracted either with respect to a scraper which engages the rim of the wheel, or both with respect to the scraper and to the ground, the wheel, under the last mentioned circumstances, operating on the ground without the aid of the spuds.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a traction engine or other vehicle to which the wheel forming the subject matter of this application has been attached, parts being broken away;

Fig. 2 is a top plan of the structure shown in Fig. 1, parts being broken away;

Fig. 3 is a vertical section of the tractor wheel;

Fig. 4 is a horizontal section of the tractor wheel; and

Fig. 5 is a fragmental section taken approximately on the line 5—5 of Fig. 4.

In the accompanying drawings, the numeral 1 denotes a portion of the body of a traction engine or other vehicle, with which is assembled a laterally offset frame 2. An axle 3 is journaled in the body 1 and in the frame 2. The numeral 4 indicates any suitable means whereby rotation may be imparted to the tractor wheel to be described hereinafter.

The tractor wheel forming the subject matter of this application includes a hub 5 carried by the axle 3 and provided with a rear flange 6, with an intermediate flange 7, and with a forward flange 17. The rim of the wheel is shown at 8. Blocks 9 are secured to or formed integrally with the rim 8 and are located on the inner face thereof, the blocks being disposed diagonally with respect to the median plane of the wheel. In the rim 8 and in the blocks 9 there are formed slots 10 which are disposed diagonally of the median plane of the wheel. The blocks 9 of the rim 8 are connected with the flange 6 and the flange 17 by means of spokes 11. Attached to one end of the frame 2 is a resilient arm 12 carrying a scraper 14 which bears on the outer curve of the rim 8, the arm constituting means whereby the scraper 14 is firmly but yieldably held in contact with the rim. The scraper 14 is disposed diagonally with respect to the median plane of the wheel, and consequently, the scraper will clean itself readily.

Blade-like spuds 15 are mounted to slide radially of the wheel in the slots 10 of the blocks 9 and the rim 8, the inner ends of the spuds 15 being secured to the rods 16. Shafts 18 are mounted to rock in the flanges 7 and 17 and are provided at their inner ends with arms 19 which are pivoted as shown at 20 to the inner ends of the rods 16. The outer ends of the shafts 18 carry arms 21 provided with rollers 22.

Mounted on the hub 5 for rotary adjustment at the will of an operator, but ordinarily fixed with respect to the hub is a cam including a sleeve 23 immediately journaled on the hub. The cam has a groove 24 formed by inner and outer flanges, a portion of the inner flange constituting a part of the sleeve 23. The cam groove 24 consists of two parts, one of which, denoted by the reference character 26, is of greater radius than the other part, the latter part of the cam groove being denoted by the numeral 25. The rollers on the arms 21 ride in the cam groove 24. The sleeve portion 23 of the cam carries a worm wheel 27 engaged by a worm 28 carried by the shaft 29 journaled in bearings 30 on the frame 2 and in one or more additional bearings 31, which may be located as desired. Rotation is imparted to the shaft 29 by any suitable means such as a hand wheel 32. The flange 7 of the hub 5 is provided on its rear face with stops 33 coacting with the arms 19 in a manner which will be set forth hereinafter.

When the parts are arranged as shown in Fig. 3 of the drawings, the rollers 22 traverse the cam groove 24. When the rollers 22 move in the part 26 of the cam groove, the spuds 15 are advanced as they enter the ground and are retracted after leaving the ground, the spuds being drawn back as they enter the part 25 of the cam groove. In this way, the spuds are prevented from striking the scraper 14. The cam member remains relatively fixed, during the ordinary operation of the machine, as above described, but it is possible to shift the cam member circumferentially, by rotating the shaft 29, the worm 28 actuating the worm wheel 27. When the cam member is shifted circumferentially to the proper position, the cam groove 24 will not only retract the spuds 15 with respect to the scraper 14, but will also retract the spuds as the same approach the surface of the soil, the wheel, under such circumstances, acting like an ordinary tractor wheel which is devoid of spuds.

When certain of the spuds 15 are advanced for engagement with the ground, the corresponding arms 19 abut against the adjacent stops 33. The corresponding arms 21 then stand in approximate alinement with the rods 16, and the spuds will not be pushed inwardly as they engage the ground. The spuds 15, are therefore, in effect, locked in advanced positions while they are engaged with the ground.

The spuds 15 are connected to the rods 16 by bolts or screws 50, and the rods have a plurality of holes 51 adapted to receive the bolts or screws. Owing to this construction, the amount which the spuds 15 project with respect to the rim 8 may be adjusted.

Having thus described the invention, what is claimed is:—

A tractor wheel comprising a rim; a hub; means for uniting the rim with the hub; spuds slidable in the rim; shafts journaled in the hub; a first crank arm and a second crank arm carried by each shaft, the first crank arm being pivoted to the inner ends of the spuds; projections mounted on the second crank arms; a cam mounted on the hub, the projections coöperating with the cam; means for shifting the cam circumferentially of the hub; and hub-carried stops wherewith certain of the arms abut when the corresponding spuds are advanced.

In testimony that I claim the foregoing as my own, I have hereto affixed my signature in the presence of two witnesses.

HENRY FOECKE.

Witnesses:
I. E. SIMPSON,
P. A. ROCKELLE.